United States Patent
Lin

(10) Patent No.: US 9,938,118 B2
(45) Date of Patent: Apr. 10, 2018

(54) LIFTING HOOK BIAS ANGLE MONITORING APPARATUS, VERTICAL HOISTING MONITORING APPARATUS AND MOBILE CRANE

(71) Applicant: Handing Lin, Fuzhou (CN)

(72) Inventor: Handing Lin, Fuzhou (CN)

( * ) Notice: Subject to any disclaimer, the term of this patent is extended or adjusted under 35 U.S.C. 154(b) by 0 days.

(21) Appl. No.: 15/525,296

(22) PCT Filed: Aug. 10, 2016

(86) PCT No.: PCT/CN2016/094382
§ 371 (c)(1),
(2) Date: May 9, 2017

(87) PCT Pub. No.: WO2016/177351
PCT Pub. Date: Nov. 10, 2016

(65) Prior Publication Data
US 2018/0009640 A1 Jan. 11, 2018

(30) Foreign Application Priority Data

Jul. 6, 2016 (CN) .......................... 2016 1 0526552
Aug. 4, 2016 (CN) .......................... 2016 1 0629162

(51) Int. Cl.
*B66C 1/40* (2006.01)
*B66C 13/06* (2006.01)
(Continued)

(52) U.S. Cl.
CPC ................ *B66C 13/16* (2013.01); *B66C 1/34* (2013.01); *B66C 1/40* (2013.01); *B66C 13/06* (2013.01);
(Continued)

(58) Field of Classification Search
CPC ........... B66C 1/40; B66C 13/06; B66C 13/46; B66C 23/00; B66C 13/10; B66C 13/18; B66C 13/48
See application file for complete search history.

(56) References Cited

U.S. PATENT DOCUMENTS 9,415,977 B2 * 8/2016 Lin .......................... B66C 13/06
9,446,934 B2 * 9/2016 Lin .......................... B66C 13/16
(Continued)

FOREIGN PATENT DOCUMENTS

| CN | 102431897 A | 5/2012 |
| CN | 103213902 A | 7/2013 |
| SU | 1257050 A1 | 9/1986 |

*Primary Examiner* — Behrooz Senfi
(74) *Attorney, Agent, or Firm* — Luoh J. Wu; Continent Patent Office LLP

(57) ABSTRACT

A lifting hook bias angle monitoring apparatus, a vertical hoisting monitoring apparatus, and a mobile crane. One method is that a lifting hook assembly serially connects connecting plates (b3) provided with hinge connection shafts (b2, b4) at two ends to a movable pulley component (b1) which bears a pulling force and a lifting hook component (b7) which bears a pulling force, and is also provided with a biaxial inclinometer (b9) on a platform surface (b8) of the connecting plates (b3) which is perpendicular to a lifting force line of action of the lifting pulley component, so as to detect a real-time lifting hook bias angle, and accordingly be developed into a mobile crane having a vertical hoisting monitoring function.

8 Claims, 4 Drawing Sheets

(51) Int. Cl.
    *B66C 13/16*      (2006.01)
    *B66C 1/34*       (2006.01)
    *G01B 11/26*      (2006.01)
    *H04N 5/232*      (2006.01)
    *H04N 5/225*      (2006.01)
    *H04N 5/268*      (2006.01)
    *H04N 7/18*       (2006.01)

(52) U.S. Cl.
    CPC ............ *G01B 11/26* (2013.01); *H04N 5/2253* (2013.01); *H04N 5/23203* (2013.01); *H04N 5/23293* (2013.01); *H04N 5/23296* (2013.01); *H04N 5/268* (2013.01); *H04N 7/185* (2013.01)

(56) References Cited

U.S. PATENT DOCUMENTS

| 9,856,118 | B1* | 1/2018 | Lin | B66C 1/40 |
| 2009/0008351 | A1* | 1/2009 | Schneider | B66C 13/063 |
| | | | | 212/272 |
| 2015/0344272 | A1* | 12/2015 | Lin | B66C 13/06 |
| | | | | 212/276 |

* cited by examiner

LIFTING HOOK BIAS ANGLE MONITORING APPARATUS, VERTICAL HOISTING MONITORING APPARATUS AND MOBILE CRANE

CROSS REFERENCE TO RELATED APPLICATIONS

This application is the national phase entry of International Application No. PCT/CN2016/094382, filed on Aug. 10, 2016, which is based upon and claims priority to Chinese Application No. CN201610526552.5, filed on Jul. 6, 2016, and Chinese Application No. CN201610629162.0, filed on Aug. 4, 2016, the entire contents of which are incorporated herein by reference.

TECHNICAL FIELD

Lifting hook bias angle monitoring apparatus, vertical hoisting monitoring apparatus and mobile crane, which belongs to technical field of crane, actually is a kind of vertical hoisting monitoring apparatus comprising a lifting hook bias angle monitoring apparatus in mobile crane; in other words, it is a mobile crane with vertical lifting monitoring function, including crawler cranes, truck cranes, wheel cranes, all-terrain cranes and lorry-mounted crane.

BACKGROUND

If the hoisted state before and after the hoisting is divided into vertical (standing) and horizontal (horizontal or inclined) states, those whose state is changed before and after the lifting are required to be hoisted; the hoisting is also applicable to motionless single-crane lifting or oversized mass lifting, so both hoisting and single-crane lifting are the basic operations for mobile crane.

According to 9.1.4 in technical standards for construction of large equipment hoisting project, the crane hoisting technology should be in line with "lifting hook should be less than 3° during hoisting"; according to 12.2.13 in petrochemical engineering construction specification for lifting, "the bias angle of lifting hook should not exceed 3° when using a flow-type crane to hoist workpieces" (herein flow-type crane means the mobile crane).

The bias angle of lifting hook refers to the angle that pulley block lifting force line (namely, resultant force line, hereinafter inclusive) acted on the lifting hook deviates from the plumb line.

Mobile crane has a series of operating functions, such as hoisting, slewing, luffing and jib telescoping and walking according to the hoisting process; all operations should be conducted in a manner of vertical hoisting.

To date however, mobile crane lacks a function of vertical lifting display monitor, so crane drivers cannot determine whether the lifting pulley block is in a vertical state, which should be completed by the driver under the command of lifting commander according to hoisted object information from vertical lifting monitor, thus resulting in belated or inaccurate disadvantages, especially in dangerous lifting, and then it can be determined that the hoisting, especially the mobile crane with large-scale hoisting process apparatus is lacking of the vertical hoisting monitoring function, therefore, it is the first path for improving security operation of mobile crane to be equipped with the vertical hoisting monitoring function for the purpose of avoiding hoisting risks.

The verticality or bias angle of lifting hook is always detected from the detected tilt angle of the sling (steel wire rope of lifting hook, hereinafter inclusive) or detected vertical posture of lifting hook via machine vision technology; According to incomplete retrieval, in the early 1980s, there was a program that lifting hook bias angle was detected from the sling, which was released on Sep. 15, 1986 by Russian SU1257050A1 patent document. As shown in Attached FIG. 1 in SU1257050A1, clamp the triangle frame 1 to sling 5 via bilateral roller 3, the triangular frame 1 could rotate around pulley shaft 4 when the sling swings; an angle measuring apparatus 2 is set on the platform of triangular frame to detect the tilt angle of sling 5.

Since 2012, the followings have appeared: 201110387199.4 crane hoisting verticality bias measuring display apparatus and hoisting method, and 201310153481.5 lifting hook bias angle detecting, monitoring apparatus and crane, disclose that the angle measuring apparatus is installed on the plane perpendicular to the lifting force line of the lifting pulley block moving pulley guard plate to detect the bias angle of the hook.

SUMMARY OF THE INVENTION

It is an object of the present invention to provide a lifting hook bias angle monitoring apparatus and vertical hoisting monitoring apparatus for a mobile crane; The ultimate aim is to provide a mobile crane with vertical lifting monitoring function, which is composed of lifting hook bias angle monitoring apparatus and vertical hoisting monitoring apparatus.

Findings: The axes of fixed and movable pulleys of pulley block rotate around the pulley block lifting force line so that the sling of the pulley block is deflected from the lifting force line as the rotation center axis (however, the bias angle of lifting hook refers to the bias angle between the pulley block lifting force and the plumb line, so the detected tilt angle of sling, which is skewed from the lifting force line of the pulley block, should not be deemed as the bias angle of the hook), hence the detection that the tilt angle of the sling is considered as the bias angle of the hook is an irreparable error, so that the bias angle of lifting hook detected from the sling has not been applied to the mobile crane so far; what's more, since machine vision technology is limited by many kinds of conditions such as sight, light and surrounding environment, it is difficult to be widely used for the detection of the bias angle of the mobile crane hook.

The pulley block lifting force line is the resultant force line of pulleys, which passes through the pulley block; the pulley block lifting force point refers to the resultant force point of pulleys, which passes through the pulley block.

Findings: since the movable pulley component of the pulley block is connected to the hook component, and the pulley block lifting force point that lifting activities of the pulley block act on the coaxial movable pulley axis is skewed, which becomes the main factor of the deviation of the book bias angle detected through the angle measuring apparatus established on the platform surface perpendicular to the lifting force line of the lifting block on the the lifting hook assembly. The offset of the resultant lifting load force point of lifting hook also possibly leads to a deviation of the detection result of the bias angle of the lifting hook using the angle measuring instrument established on the platform surface perpendicular to the lifting force line of the lifting block on the the lifting hook assembly.

Findings: The rotation of movable and fixed pulley axes along the lifting pulley block lifting force line, and rotation of movable pulley axis along the vertical axis of hook stalk or the autorotation of lifting hook are operated and controlled by the movement orientation of the hook and force of the suspended mass.

When the main and auxiliary cranes (including two crane, hereinafter inclusive) co-hoist, the lifting force line of lifting hook through main and auxiliary cranes and the gravity line through the gravity center of the hoisted mass should be located in the same plumb plane; fixed and the movable pulley axes of main and auxiliary cranes are rotated by the convergence and restriction of the hoisting force and orientation of collaborative crane when the main and auxiliary cranes are respectively centered on each other; therefore the bias angle orientation of lifting hooks of main and auxiliary cranes is determined by the hook assembly line of main and auxiliary cranes in real time on the plumb plane where the three-force line is located.

The crane in this application document refers to mobile crane; "Single crane" means "one mobile crane"; "Two cranes" refers to "two mobile cranes"; Main and auxiliary cranes refer to main mobile crane and auxiliary mobile crane respectively; "The crane" represents "the mobile crane"; Collaborative crane means the mobile crane assisting the hoisting.

One lifting hook bias angle monitoring apparatus, featured with: the hook bias angle detection, including the hook assembly of mobile crane consisting of movable pulley component and hook component, is provided with a platform plane perpendicular to the lifting pulley block lifting force line, and the lifting pulley block lifting force line through the hook is still perpendicular to the platform plane when the lifting pulley block is raised and lowered under different bias angles, then an angle measuring apparatus is installed on the platform plane to detect the bias angle of lifting hook; The orientation of the lifting hook bias angle refers to the angle formed through the following manner that the hook perpendicular to the intersecting line of the platform plane and horizontal plane, which is operated and controlled by the movement orientation of the hook and force of the suspended mass, rotates around the lifting pulley block lifting force line through the fixed and movable pulley axis of pulley block, together with the rotation of movable pulley axis along hook stalk or the autorotation of lifting hook.

Preferably, the movable pulley component of the hook assembly may be coupled to the hook component via bilateral connecting plate; the hinge shaft between the movable pulley component and the bilateral connecting plate is disposed perpendicularly to the axis of the coaxial movable pulley, and the hinge shaft between the bilateral connecting plate and the hook component is also disposed perpendicularly to the axis of the coaxial movable pulley; moreover, with respect to the skewing of the synergistic force point acting on the hook, a hinge shaft parallel to the axis of coaxial movable pulley and perpendicular to the coaxial movable pulley axis is mounted in the hook component, which can be adjusted automatically (at this time, the lifting hook axis is slightly skewed, but the hook component is under tension), an angle measuring apparatus therefore is installed on the platform plane, where the bilateral connecting plate is perpendicular to the lifting pulley block lifting force, to detect the hook bias angle of the mobile crane.

It is preferable that a camera is installed on the mobile crane jib to monitor the orientation change of the hook bias angle, and the orientation of the real-time hook bias angle is wirelessly displayed on the operating chamber of mobile crane.

The orientation change of the real-time hook bias angle is displayed in the operating chamber of mobile crane through wireless transmission so that the clear orientation change image of the hook bias angle can be obtained at a height or a distance or when the crane operator cannot view the same, and then the operator is able to correctly control the movement of the hook.

Since fixed and movable pulley axes of the pulley block rotate around the lifting force line of pulley block, an important condition is provided for smooth fluctuation of the angular position of the hook, so it is possible to smoothly change and adjust the angular position of the hook in the hoisting state when the crane operator could control correctly the running orientation of the lifting hook.

The vertical lifting of the mobile crane can only be realized by synergistically monitoring the bias angle and its orientation of lifting hook.

When the mobile crane sling is provided with a platform plane perpendicular to the lifting pulley block lifting force line, and when the pulley block is raised and lowered under different hook bias angles, the lifting pulley block lifting force line is still perpendicular to the installed platform plane, then an angle measuring apparatus may be installed on platform plane of sling to detect the hook bias angle of the mobile crane.

The detection of lifting hook bias angle for the mobile crane, is also appropriate for the detection of hook bias angle for other types of cranes with the same type substantially as the mobile crane lifting pulley block and hook assembly.

One vertical hoisting monitoring apparatus, used for the monitoring single crane vertical lifting of the mobile crane, vertical hoisting of the main and auxiliary cranes, and the vertical hoisting of two cranes, is characterized in that the hook bias angle detection, including the hook assembly of movable crane, is provided with a platform plane perpendicular to the lifting pulley block lifting force line, and when the pulley block is raised and lowered under different hook bias angles, the lifting pulley block lifting force line is still perpendicular to the installed platform plane, then a biaxial inclinometer is installed on the platform plane where the platform plane is relative to the dip angle of horizontal plane to detect the bias angle.

Alternatively, the movable pulley component of the hook assembly is coupled to the hook component via bilateral connecting plate; the hinge shaft between the movable pulley component and the bilateral connecting plate is disposed perpendicularly to the axis of the coaxial movable pulley, and the hinge shaft between the bilateral connecting plate and the hook component is also disposed perpendicularly to the axis of the coaxial movable pulley; moreover, with respect to the skewing of the synergistic force point acting on the hook, the hinge shaft parallel to the axis of coaxial movable pulley and that perpendicular to the coaxial movable pulley axis is mounted in the hook component, which can be adjusted automatically (at this time, the lifting hook axis is slightly skewed, but the hook component is under tension); a biaxial inclinometer therefore is installed on the platform plane, where the bilateral connecting plate is perpendicular to the lifting pulley block lifting force, to detect the hook bias angle of the mobile crane.

Simultaneously a set of apparatus with remotely switchable three-channel switch mounted in mobile crane operating chamber is arranged in the hook assembly to wirelessly transmit the measured biaxial hook bias angle signal.

Besides, three sets of three-channel switching hook bias angle receiving and processing display apparatuses are installed in the operating chamber of mobile crane;

The orientation of the lifting hook bias angle refers to the angle formed through the following manner that the hook perpendicular to the intersecting line of the platform plane and horizontal plane, which is operated and controlled by the movement orientation of the hook and force of the suspended mass, rotates around the lifting pulley block lifting force line through the fixed and movable pulley axis of pulley block, together with the rotation of movable pulley axis along hook stalk or the autorotation of lifting hook.

For main and auxiliary cranes, the orientation of lifting hook bias angle at the time of hoisting will be determined by the link line between the hook assemblies for main and auxiliary cranes.

With respect to "two-crane hoisting", in addition to monitoring the vertical hoisting, it should also monitor the supernormal (exceeding the designed hoisting value) changes in loads of two cranes. When the two lifting point position of two-crane hoisting is determined, the load at the two hoisting point will change extraordinarily during the hoisting just only because the line slope of the two hoisting point deviates from the designed value; therefore, the crane could be operated based on the real-time ratio of two-crane load, which actually means the line slope of the two hoisting point is limited to a certain value; if the normal two-crane load ratio is 1, the crane driver can take the two-crane load ratio 1 as a target to operate the crane so as to realize balance hoisting.

Preferably, the mobile crane is provided with a load monitoring apparatus:

① The mobile crane is equipped with the same load detector and a set of remotely switchable three-channel wireless transmitter to wirelessly transmit the real-time load signals of the crane, and the remote control switch of the wireless transmitter is arranged in the crane operating chamber; the crane operating chamber is equipped with a set of three-channel switching & crane load receiving control equipment matched with the wireless transmission equipment, and two sets of three-channel switching collaborative crane load receiving control apparatus:

② At least one set of load ratio display indicating the real-time load ratio is installed in the mobile crane operating chamber, and the two input ends of the load ratio display are respectively connected with the output ends of the local load receiving control apparatus and the collaborative crane load receiving control apparatus.

Input signal of them based on the load ratio=collaborative crane load/local crane load; the real-time load ratio will be displayed on the LCD through PC processing.

In order to improve the comparability of real-time local crane load and collaborative crane load, both the crane and the collaborative crane should be provided with the same load detector. For instance, a grommet type load cell has been installed on the place between the fixing nut at the end of hook head and the connecting beam in the crane to constitute a load detector; moreover, the same approach has applied to the collaborative crane; it should be noted that the specifications of load cell should be the same with those of crane.

Since the number of individual hoisting point with clear force is ≤3, and generally it is single-crane hoisting or main and auxiliary hoisting, or the two-crane hoisting.

Preferably, in case of single-crane hoisting: The hook bias angle wireless transmission equipment, which occupies a channel, is enabled by means of a remote control switch provided in the mobile crane operating chamber while enabling only the hook bias angle receiving processing apparatus for receiving the local channel:

Preferably in case of main and auxiliary hoisting: lifting hook bias angle wireless transmission equipment for each of the main and auxiliary cranes respectively, which occupies one channel is enabled by an remote control switch provided in the mobile crane operating chamber; the receiving and processing apparatus provided in the mobile crane operating chamber, not only switches one set to the crane channel, but shows the hook bias angle of the crane in the crane operating chamber; it will also switch the receiving & processing apparatus that receives the lifting hook bias angle of collaborative crane to the collaborative crane channel, and will respectively display the collaborative crane hook bias angle in the crane operating chamber.

Preferably, in case of two-crane hoisting: Each of the two cranes respectively occupies one channel through the lifting hook bias angle wireless transmission equipment enabled by the remote control switch provided in the crane operating chamber; the receiving and processing apparatus provided in the crane operating chamber, not only switches one set to the crane channel, but shows the hook bias angle of the crane in the crane operating chamber, it will also switch the receiving & processing apparatus that receives the lifting hook bias angle of collaborative crane to the collaborative crane channel, and will respectively display the collaborative crane hook bias angle in the crane operating chamber.

Simultaneously, lifting hook bias angle wireless transmission equipment for each of the two cranes respectively, which occupies one channel is enabled by an remote control switch provided in the crane operating chamber; the load receiving control apparatus provided in the mobile crane operating chamber, not only switches one set to the crane channel, but shows the hook bias angle of the crane in the crane operating chamber; it will also switch the load receiving control apparatus that receives the load of collaborative crane to the collaborative crane channel, and will respectively display the collaborative crane load state in the crane operating chamber.

Beneficial effects of the hook bias angle monitoring and vertical hoisting monitoring apparatus: 1. translating the hook bias angle detection into the detection of dip angle between the platform plane and the horizontal plane (surface-to-plane), overcoming the influence of pulley block lifting force point skewing and resultant lifting load force point skewing on the hook bias angle detection, only in this way can the correct detection of the hook angle be achieved. 2. The operator can correctly control the hook operation in response to the real-time hook bias angle orientation change image displayed in the operating chamber, smoothly change the hoisting state and correct the orientation of hook bias angle during hoisting upon the rotation of fixed and movable pulley axes around the pulley block lifting force line. 3. The real-time hook bias angle is displayed in both operating of the co-hoisting crane, making vertical hoisting available; 4. The hook bias angle detection apparatus has overcome the bias of sling-based hook bias angle detection technique, which is applicable to both single-crane hoisting and lifting mobile crane with the function of vertical lifting monitoring, and is in demand for long term.

The vertical hoisting monitoring apparatus is installed on the mobile crane, that is, the crane has the functions of single-crane vertical hoisting monitoring, main and auxiliary hoisting or two-crane vertical hoisting monitoring.

DETAILED DESCRIPTION OF THE INVENTION

I. Lifting Hook Bias Angle Detection Monitoring and Vertical Hoisting

Figure 1:
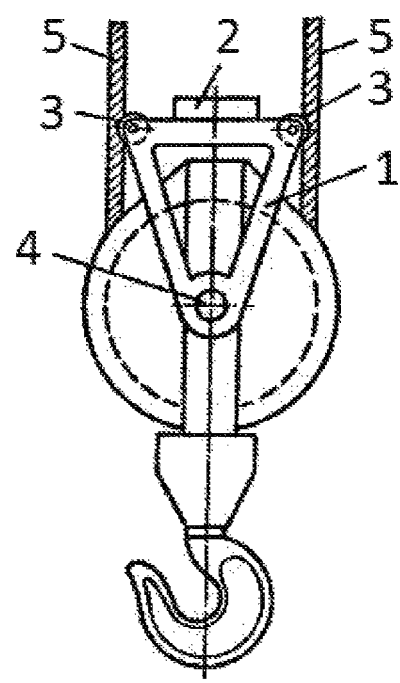
FIG. 1 Attached Figure of SU1257050A1.
Figure 2:
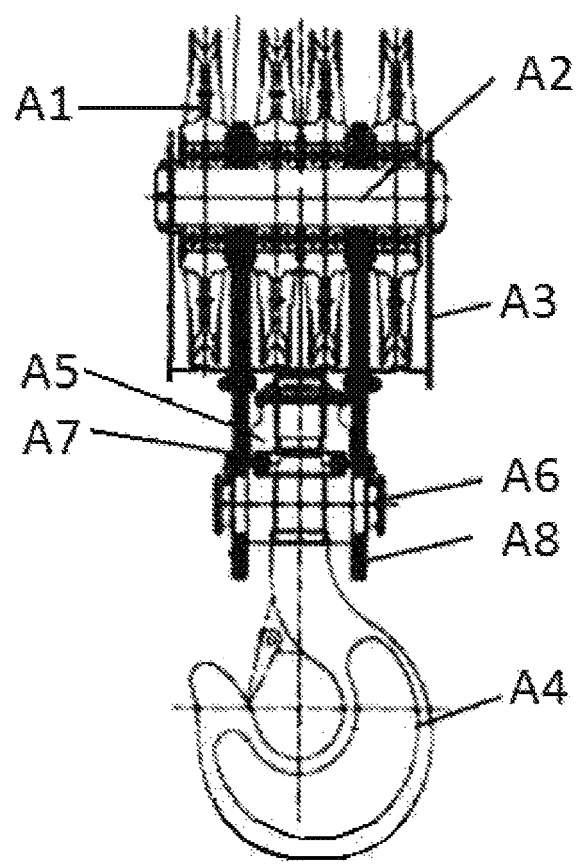
FIG. 2 Structure Diagram of Hook Assembly, marks herein: A1 Movable Pulley, A2 Pulley Shaft, A3 Guard Plate, A4 Lifting Hook, A5 Nut, A6 Beam. A7 Bearing, A8 Choke Plate.
Figure 3:
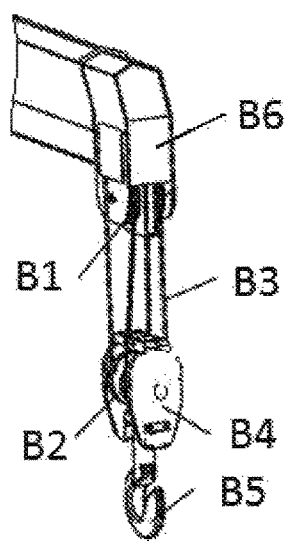
FIG. 3 Structure Diagram of Lifting Pulley Block, marks herein: B1 Fixed Pulley, B2 Movable Pulley, B3 Steel Wire Rope, B4 Guard Plate. B5 Lifting Hook, B6 Jib.
Figure 4:
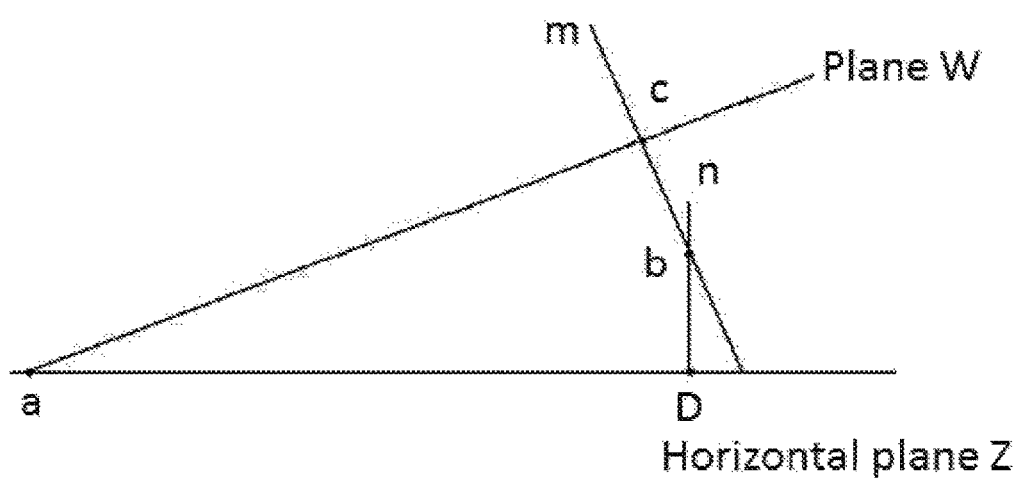
FIG. 4 Description of Lifting Hook Bias Angle Detection.

The mobile crane is equipped with the single pulley block, and clock wisely round-by-round crossing and winding is adopted; the procedures of lifting hook bias angle detection for the mobile crane are as follows: If the hook assembly is equipped with the platform plane perpendicular to the lifting force line of the pulley block, the lifting pulley block lifting force line through the hook is still perpendicular to the installed platform plane when the lifting pulley block is raised and lowered under different bias angles, and then: The included angle between the platform plane and horizontal plane is equal to the bias angle of lifting hook; the orientation of the lifting hook bias angle refers to the one perpendicular to the intersecting line of the platform plane and horizontal plane through the hook, which points to the high end of platform plane, as shown in FIG. 4: The intersecting angle between the lifting force line m through lifting hook point b and plumb line n through the same point is assumed as ∠b, and that between platform plane W and horizontal plane Z is ∠a, when the lifting pulley block hook assembly of mobile crane is equipped with the platform plane perpendicular to the lifting force line of the pulley block, the lifting pulley block lifting force line m through the hook is still perpendicular to the platform plane w when the lifting pulley block is raised and lowered under different bias angles; therefore the lifting force line m and plumb line n are perpendicular to platform plane W and horizontal plane Z respectively, namely ∠a=∠b, in other words, the lifting hook bias angle ∠b is equal to the included angle ∠a between the platform plane W and horizontal plane Z, and the orientation of the lifting hook bias angle is perpendicular to the intersecting line of platform plane W and horizontal plane Z, and points to the high end of platform plane.

Further analysis: as shown in FIG. 4, the foot points of vertical line from the point b in dihedral angle to the W and Z planes are C and D respectively: Ca is drawn on the plane through point C, which is perpendicular to point a on intersecting line L between plane W and plane Z; connect D to a;

∵L ⊥ Ca, L ⊥ bC, ∴L ⊥ plane bCa, ∴L ⊥ ba, and ∵L ⊥ bD, ∴L ⊥ plane bDa, ∴L ⊥ Da,

∴∠CaD means the plane angle of the dihedral angle; quadrangle aCbD is coplanar with straight lines m and n, and ∠C=∠D=90°.

Therefore ∠a (its supplementary angle is ∠CbD) is numerically equal to ∠b that is the acute angle of intersection of line m and line n.

Hence the procedures of lifting hook bias angle detection are as follows: A biaxial inclinometer is provided on the plane where the hook assembly of mobile crane is perpendicular to the lifting pulley block lifting force line; the dip angle detected between X axis inclinometer and Y axis inclinometer (as shown in FIG. 4) is handled into ∠b) that lifting force line m through lifting hook b is skewed from the plumb line n through lifting hook b, and then is perpendicular to ∠CaD of intersecting line of platform plane w and horizontal line z.

Figure 5:
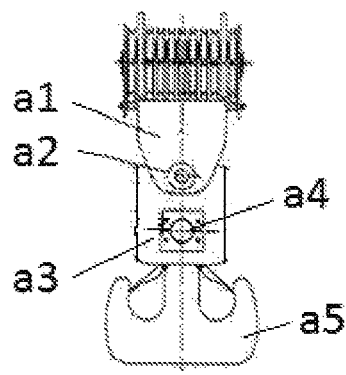
FIG. 5 Description of Overcoming Skewing Influence of the Lifting Force Point.

In order to overcome the abnormal fluctuation of the hook bias angle caused by the non-hook deflection during the ascending and descending operations of lifting pulley block, the hinge shaft of the movable pulley component and the hook is installed in a orientation perpendicular to the axis of the coaxial movable pulley. FIG. 5 shows a state in which the movable pulley component a1 is coupled to the hook a5 through the coupling body a3, since hinge shaft a2 is perpendicular to movable pulley axis, when the ascending and descending motions of the lifting pulley block fluctuates caused by lifting hook bias angle changes of movable pulley axis orientation due to the non-hook deflection, the movable pulley component a1 will adjust automatically along the hinge axis a2; at this moment, the movable pulley axis is tilted slightly and the movable pulley component a1 is pulled, however FIG. 5 does not completely overcome the impact of deflection of lifting hook resultant lifting load force point on the detection of hook bias angle.

Figure 6:
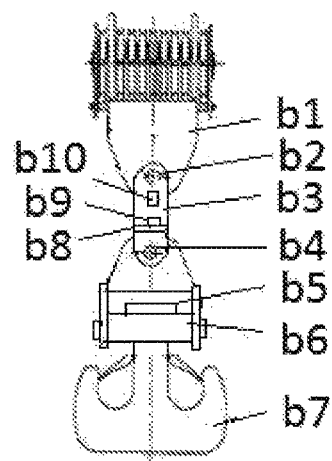
FIG. 6 Schematic Diagram of Lifting Hook Bias Angle Detection.

FIG. 6 shows that the movable pulley component b1 of hook assembly is coupled to hook component b7 through the connecting plate b3; the hinge shaft b2 of movable pulley component and bilateral connecting plate, and the hinge shaft b4 of bilateral connecting plate and hook component are arranged in the orientation perpendicular to the axis of the coaxial movable pulley: the locking nut b5 of the hook pressing against thrust bearing is supported on the hinge shaft (beam shaft) b6, and is rotatable along the vertical axis (or called as hook axis) of the hook stalk; therefore relative to the hook, the movable pulley axis may also rotate along the vertical axis of the hook stalk. When the ascending and descending motions of the lifting pulley block fluctuates caused by lifting hook bias angle changes of movable pulley axis orientation due to the non-hook deflection, after the self-adjustment of hinge shaft b2 perpendicular to the coaxial movable pulley axis, the movable pulley axis is tilted slightly and the movable pulley component b1 is pulled: as for the skewing of the synergistic force point acting on the hook, after the hook axis is titled slightly and the hook component b7 is pulled upon rotation of hinge shaft b6 parallel to and that of hook component around the hinge shaft b4 perpendicular to coaxial movable pulley axis; Therefore, bilateral connecting plate b3 is equipped with the platform plane perpendicular to the lifting force line of the pulley block, and the lifting pulley block lifting force line through the hook is still perpendicular to the installed platform plane when the lifting pulley block is raised and lowered under different bias angles; As a result, a platform plane b8 perpendicular to the lifting force line of the lifting pulley block is installed on bilateral connecting plate b3 and an angle measuring apparatus b9 is provided on the platform plane to detect the hook bias angle of the mobile crane; b10 represents wireless transmitter.

The hook assembly of the mobile crane should be an integrated mechanism undertaking the hanging weight and installing hook bias angle detection apparatus, just as that in FIG. 6. Sufficient space is provided for the installation of large hook bias angle detection apparatus in the connection plate, which not only facilitates installation of large-capacity rechargeable battery, but also easy to apparatus protection (part of one side of transmitter installed may be made by glass fiber reinforced plastics).

For main and auxiliary cranes, the orientation of lifting hook bias angle at the time of hoisting will be determined by the link line between the hook assemblies for main and auxiliary cranes. The crane operator can, based on the main and auxiliary hoisting real-time image displayed on the screen of mobile crane operating chamber, identify the orientation determined by the connection of the main and auxiliary hook assemblies, and judge its corresponding changes so that the hoisted mass could change the orientation of the hanger bias angle smoothly or maintain the original position upon adjustment, and then reduce the hook bias angle after coordination: moreover, this operation runs through the constant hoisting of the whole process, and constitutes an indispensable link of hoisting operations (especially vertical hoisting) for the mobile crane.

Crane co-hoisting is conducted based on the followings: there is relative rotation between the fixed and movable pulley axes of the pulley block; the hook bias angle detected during main and auxiliary hoisting or two-crane hoisting and the lead-lag change are located on the same plumb plane due to crane centering. During co-hoisting, operating chamber will display the local real-time hook bias angle, but also shows the hook bias angle of collaborative party, achieving "mutual understanding".

II. Mobile Crane with Vertical Hoisting Monitoring Function

The vertical hoisting monitoring apparatus is installed on the mobile crane, that is, the crane has the functions of single-crane vertical hoisting monitoring, main and auxiliary hoisting or two-crane vertical hoisting monitoring.

One lifting hook bias angle monitoring apparatus of mobile crane. For instance, main and auxiliary cranes hoisting:

Given that the series of mobile crane has been equipped with the fixed apparatuses below:

The hook bias angle detection, including the hook assembly of mobile crane, is provided with a platform plane perpendicular to the lifting pulley block lifting force line, and when the pulley block is raised and lowered under different hook bias angles, the lifting pulley block lifting force line through the hook is still perpendicular to the installed platform plane, then a biaxial dynamic inclinometer is installed on the platform plane, where the platform plane is relative to the dip angle of horizontal plane, to detect the hook bias angle.

Or as shown in FIG. 6, the movable pulley component of the hook assembly may be coupled to the hook component via bilateral connecting plate; the hinge shaft between the movable pulley component and the bilateral connecting plate is disposed perpendicularly to the axis of the coaxial movable pulley, and the hinge shaft between the bilateral connecting plate and the hook component is also disposed perpendicularly to the axis of the coaxial movable pulley; moreover, with respect to the skewing of the synergistic force point acting on the hook, a hinge shaft parallel to the axis of coaxial movable pulley and perpendicular to the coaxial movable pulley axis is mounted in the hook component, which can be adjusted automatically (at this time, the lifting hook axis is slightly skewed, but the hook component is under tension); a biaxial dynamic inclinometer therefore is installed on the platform plane, and the platform plane on the bilateral connecting plate is perpendicular to the lifting pulley block lifting force to detect the hook bias angle of the mobile crane.

(2) While a set of three-channel remote control switch will be provided to wirelessly transmit the detected hook bias angle signal along two axes, and power supply battery of apparatus is arranged; besides, three sets of three-channel switching hook bias angle receiving and processing apparatuses are installed in the operating chamber of mobile crane, thereby the received biaxial hook bias angle signal is processed as the hook declination dynamic since the bias angle of the hook is the sun of the bias angle component vector of the orthogonal two hooks;

(3) A load monitoring apparatus is installed on the crane: ① The mobile crane is equipped with the same load detector and a set of remotely switchable three-channel wireless transmitter to wirelessly transmit the real-time load signals of the crane, and the remote control switch of the wireless transmitter is arranged in the crane operating chamber, the crane operating chamber is equipped with a set of three-channel switching & crane load receiving control equipment matched with the wireless transmission equipment, and two sets of three-channel switching collaborative crane load receiving control apparatus; ② At least one set of load ratio display indicating the real-time load ratio is installed in the mobile crane operating chamber, and the two input ends of the load ratio display are respectively connected with the output ends of the local load receiving control apparatus and the collaborative crane load receiving control apparatus.

(4) An auto-focusing camera is provided on the crane jib, which can rotate in a horizontal plane and/or a vertical plane, and a data transmission router is also arranged: a computer whose wireless card matches the router is set in the mobile crane operating chamber to control the rotation of the camera and display the changes of hook bias angle orientation and hoisting conditions during the real-time hoisting.

In case of main and auxiliary cranes hoisting: lifting hook bias angle wireless transmission equipment for each of the main and auxiliary cranes respectively, which occupies one channel, is enabled by an remote control switch provided in the crane operating chamber; the receiving and processing apparatus provided in the mobile crane operating chamber, except for a set of switching channel making the real-time hook bias angle of the crane display outside the crane operating chamber, will also switch the receiving & processing apparatus that receives the lifting hook bias angle of collaborative crane to the collaborative crane channel, and will respectively display the real-time hook bias angle of collaborative crane in the crane operating chamber.

Crane operator, according to the main and auxiliary cranes real-time hook bias angle displayed in the operating chamber of the crane, and real-time changes and lifting conditions of hook bias angle, can raise the main crane and deliver forwardly the auxiliary crane within the allowable range of hook bias angle, and operate them on the premise of up-to-standard hook bias angle of auxiliary crane (because hook bias angles of main and auxiliary cranes are almost inversely proportional to the hoisted weight they bear); meanwhile, the operator should note that in case of too slow raising main crane or excessively fast delivering forwardly the auxiliary crane, the force of main crane will reduce, and that of auxiliary crane is contrary. No unnecessary details will be given.

Note that the above descriptions are instances of implementation mode of the Invention. For general technical personnel in this field, several modifications and revisions based on the Invention should be seemed as the protective range of the Invention.

What is claimed is:

1. A lifting hook bias angle monitoring apparatus, comprising a platform plane perpendicular to a lifting pulley block lifting force line and which is set on a mobile crane's hook assembly comprising a movable pulley component and a hook component, wherein said lifting pulley block lifting force line through a hook is still perpendicular to said platform plane when said hook is under different bias angles or a lifting pulley block is raised and lowered, then an angle measuring apparatus is installed on said platform plane to detect a bias angle of said hook; an orientation of a lifting hook bias angle is through said hook and perpendicular to an intersecting line of said platform plane and a horizontal plane, said orientation of said lifting hook bias angle is compelled and limited by a movement orientation of said hook and a lifted load's gravity, and said orientation of said lifting hook bias angle is changed by combined action of a relative deflection between axes of a fixed pulley and a movable pulley around said lifting pulley block lifting force line and a rotation of an axial line of said movable pulley around a vertical axis of a hook shank or a rotation of said hook around itself.

2. The lifting hook bias angle monitoring apparatus according to claim 1, wherein said movable pulley component and said hook component of said hook assembly are connected via two connecting plates located on both sides respectively, a first hinge shaft connecting said movable pulley component and said two connecting plates is disposed perpendicularly to an axis of a coaxial movable pulley, a second hinge shaft connecting said two connecting plates and said hook component is also disposed perpendicularly to said axis of coaxial movable pulley; moreover, with respect to an offset of an action point of a resultant force of said lifted load's gravity acting on said hook, said hook component is provided with a third hinge shaft parallel to said axis of coaxial movable pulley, then said hook component adjusts itself via said third hinge shaft and said second hinge shaft perpendicular to said axis of coaxial movable pulley; said angle measuring apparatus therefore is installed on said platform plane perpendicular to said lifting pulley block lifting force to detect said hook bias angle of said mobile crane, wherein said platform plane is on said two connecting plates.

3. The lifting hook bias angle monitoring apparatus according to claim 1, wherein a camera is installed on a jib of said mobile crane to monitor orientation change of said hook bias angle, and an orientation of a real-time hook bias angle is wirelessly transmitted and displayed on an operating chamber of said mobile crane.

4. A vertical hoisting monitoring apparatus, applied to a mobile crane to monitor vertical hoisting of a single crane, vertical hoisting of main and auxiliary cranes and vertical hoisting of two cranes, comprising
a platform plane, perpendicular to a lifting pulley block lifting force line and which is set on a mobile crane's hook assembly,
wherein said lifting pulley block lifting force line through a hook is still perpendicular to said platform plane when said hook is under different bias angles or a lifting pulley block is raised and lowered, then a bi-axial inclination sensor to detect an angle of said platform plane relative to a horizontal plane is installed on said platform plane to detect a bias angle of said hook; alternatively, a movable pulley component and a hook component of said hook assembly are connected via two connecting plates located on both sides respectively, a first hinge shaft connecting said movable pulley component and said two connecting plates is disposed perpendicularly to an axis of a coaxial movable pulley, a second hinge shaft connecting said two connecting plates and said hook component is also disposed perpendicularly to said axis of coaxial movable pulley;
moreover, with respect to an offset of an action point of a resultant force of a lifted load's gravity acting on said hook, said hook component is provided with a third hinge shaft parallel to said axis of coaxial movable pulley, then said hook component adjusts itself via said third hinge shaft and said second hinge shaft perpendicular to said axis of coaxial movable pulley; said bi-axial inclination sensor therefore is installed on said platform plane perpendicular to a lifting pulley block lifting force to detect a hook bias angle of said mobile crane, wherein said platform plane is on said two connecting plates;
simultaneously, a set of remotely switchable three-channel wireless transmitter with a teleswitch mounted in a mobile crane operating chamber is arranged on said hook assembly to wirelessly transmit said hook bias angle's detected signals along bi-axial direction; besides, three sets of three switchable channel receiving-processing-display device of said hook bias angle, are installed in said operating chamber of said mobile crane;
an orientation of said lifting hook bias angle is through said hook and perpendicular to an intersecting line of said platform plane and a horizontal plane, said orientation of said lifting hook bias angle is compelled and limited by a movement orientation of said hook and a lifted load's gravity, and said orientation of said lifting hook bias angle is changed by combined action of a relative deflection between axes of a fixed pulley and a movable pulley around said lifting pulley block lifting force line and a rotation of an axial line of said movable pulley around a vertical axis of a hook shank or a rotation of said hook around itself;
the bias angle orientation of main and auxiliary cranes' hooks at a time of hoisting is determined by a link line between hook assemblies of the main and auxiliary cranes.

5. The vertical hoisting monitoring apparatus according to claim 4, wherein in order to monitor an orientation change of the hook bias angle, a mobile crane jib is provided with an auto-focusing camera, rotating in a horizontal plane and/or a vertical plane, and a data transmission router, matching with a wireless card of a computer which is set up in said mobile crane operating chamber to control a rotation of the auto-focusing camera and display said orientation change of said hook bias angle and hoisting conditions during a real-time hoisting.

6. The vertical hoisting monitoring apparatus according to claim 4, wherein said mobile crane is provided with a load monitoring device for said vertical hoisting of two cranes:
said two cranes are both provided with a same load detector and a set of remotely switchable three-channel wireless transmitter with the teleswitcb mounted in its own crane's operating chamber to wirelessly transmit detected load signals; besides, each crane's operating chamber is provided with a set of three switchable channel receiving-control device, receiving load signals of its own crane and two sets of three switchable channel receiving-control device receiving load signals of other collaborative crane;

each crane's operating chamber is provided with at least one set of load ratio processing display indicating a real-time load ratio, wherein a first input of said load ratio processing display is connected to an output of said receiving-control device receiving load signals of its own crane, and a second input of said load ratio processing display is connected to an output of said receiving-control device receiving load signals of an other collaborative crane.

7. The vertical hoisting monitoring apparatus according to claim 4, wherein during hoisting of a single-crane, a hook bias angle wireless transmitter is enabled by means of said teleswitch installed in said mobile crane's operating chamber which occupies a channel, while said receiving-processing-display device of said hook bias angle which receives a channel of said single crane is only enabled;

during hoisting of said main and auxiliary cranes, said hook bias angle wireless transmitter of said main crane is enabled by means of said teleswitch installed in said main crane's operating chamber, which occupies a channel, one set of receiving-processing-display device in said main crane's operating chamber is switched to a channel of said main crane to receive hook bias angle signals of said main crane, then indicates a hook bias angle of said main crane outside said main crane's operating chamber, meanwhile one set of said receiving-processing-display device in said main crane's operating chamber is switched to a channel of said auxiliary crane to receive hook bias angle signals of said auxiliary crane, then indicates a hook bias angle of said auxiliary crane outside said main crane's operating chamber;

said hook bias angle wireless transmitter of said auxiliary crane is enabled by means of said teleswitch installed in said auxiliary crane's operating chamber, which occupies a channel, one set of receiving-processing-display device in said auxiliary crane's operating chamber is switched to a channel of said auxiliary crane to receive hook bias angle signals of said auxiliary crane, then indicates a hook bias angle of said auxiliary crane outside said auxiliary crane's operating chamber, meanwhile one set of receiving-processing-display device in said auxiliary crane's operating chamber is switched to a channel of said main crane to receive hook bias angle signals of said main crane, then indicates a hook bias angle of said main crane outside said auxiliary crane's operating chamber;

during hoisting of two cranes, said hook bias angle wireless transmitter of said first crane is enabled by means of said teleswitch installed in said first crane's operating chamber, which occupies a channel, one set of receiving-processing-display device in said first crane's operating chamber is switched to a channel of said first crane to receive hook bias angle signals of said first crane, then indicates a hook bias angle of said first crane outside said first crane's operating chamber, meanwhile one set of receiving-processing-display device in said first crane's operating chamber is switched to a channel of said second crane to receive book bias angle signals of said second crane, then indicates a hook bias angle of said second crane outside said first crane's operating chamber;

said hook bias angle wireless transmitter of said second crane is enabled by means of said teleswitch installed in said second crane's operating chamber, which occupies a channel, one set of receiving-processing-display device in said second crane's operating chamber is switched to a channel of said second crane to receive hook bias angle signals of said second crane, then indicates a hook bias angle of said second crane outside said second crane's operating chamber, meanwhile one set of receiving-processing-display device in said second crane's operating chamber is switched to a channel of said first crane to receive hook bias angle signals of said first crane, then indicates a hook bias angle of said first crane outside said second crane's operating chamber;

simultaneously, said load wireless transmitter of said first crane is enabled by means of said teleswitch installed in said first crane's operating chamber, which occupies a channel, one set of receiving-control device receiving load signals in said first crane's operating chamber is switched to a channel of said first crane to receive load signals of said first crane, then indicates a real-time load of said first crane outside said first crane's operating chamber, meanwhile one set of receiving-control device in said first crane's operating chamber is switched to a channel of said second crane to receive load signals of said second crane, then indicates a real-time load of said second crane outside said first crane's operating chamber;

said load wireless transmitter of said second crane is enabled by means of said teleswitch installed in said second crane's operating chamber, which occupies a channel, one set of receiving-control device in said second crane's operating chamber is switched to a channel of said second crane to receive load signals of said second crane, then indicates a real-time load of said second crane outside said second crane's operating chamber, meanwhile one set of receiving-control device in said second crane's operating chamber is switched to a channel of said first crane to receive load signals of said first crane, then indicates a real-time load of said first crane outside said second crane's operating chamber.

8. A lifting hook bias angle monitoring apparatus, comprising a movable pulley component and a hook component of a hook assembly, which are connected via two connecting plates located on both sides respectively, wherein a first hinge shaft connecting said movable pulley component and said two connecting plates is disposed perpendicularly to an axis of a coaxial movable pulley, a second hinge shaft connecting said two connecting plates and said hook component is also disposed perpendicularly to said axis of coaxial movable pulley; moreover, with respect to an offset of an action point of a resultant force of said lifted load's gravity acting on said hook, said hook component is provided with a third hinge shaft parallel to said axis of coaxial movable pulley, then said hook component adjusts itself via said third hinge shaft and said second hinge shaft perpendicular to said axis of coaxial movable pulley; an angle measuring apparatus therefore is installed on a platform plane perpendicular to said lifting pulley block lifting force to detect a hook bias angle of a mobile crane or other type of crane, wherein said platform plane is on said two connecting plates.

* * * * *